June 30, 1964 T. J. HOSEA 3,139,295
FASTENING DEVICE
Filed Dec. 1, 1961

INVENTOR.
Thomas J. Hosea
BY George A. Schmidt
ATTORNEY

United States Patent Office 3,139,295
Patented June 30, 1964

3,139,295
FASTENING DEVICE
Thomas J. Hosea, Grosse Pointe Woods, Mich., assignor to General Motors Corporation, Detroit, Mich., a corporation of Delaware
Filed Dec. 1, 1961, Ser. No. 156,441
5 Claims. (Cl. 287—3)

This invention relates to fastening devices, and more particularly to a fastening device for securing a first link member to a second link member and permitting relative pivotal rotation between the two links.

In the design and manufacture of many articles it is often found necessary to have two lever members or link members joined at their ends and being pivotal or slidable relative to each other. This requires some sort of pivot or sliding means for attaching the two parts together, which means are usually relatively expensive, cumbersome and complicated. A particular requirement of such means is positive retention of the two parts, a requirement which restricts the use of various types of pivotal means in many installations.

The device in which this invention is embodied is a sheet metal spring clip which is so formed as to be received and retained over one end of one of the link members. The device is provided with an integral gudgeon or pivot means which receives the second link member and permits whatever relative motion is desired. The device is also provided with a spring portion which engages the second link member and retains it in position with respect to the first link member.

Such a fastening device is not only positive in its retention means but is also removable for disassembly or repair and replacement of the various parts. It is a relatively inexpensive and uncomplicated device which is easily installed on the various link members.

These and other advantages will become more apparent from the following description and drawing, in which.

Figure 1:
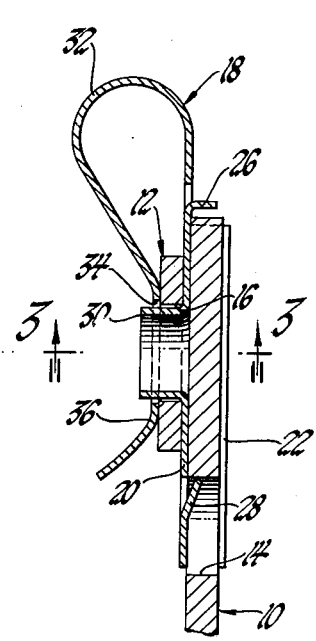
FIGURE 1 is a view with parts broken away and in section of a pair of link members secured together by means of the fastening device.
Figure 2:
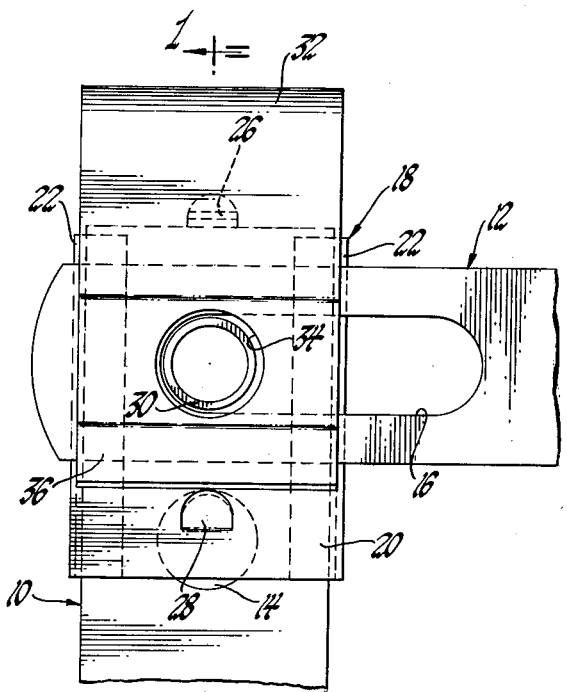
FIGURE 2 is a side view of the assembly illustrated in FIGURE 1.
Figure 3:
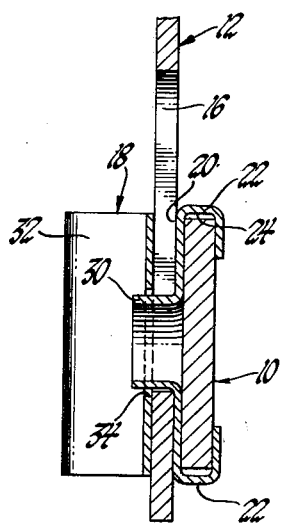
FIGURE 3 is a cross-sectional view of the assembly shown in FIGURES 1 and 2, and taken substantially along the line 3—3 of FIGURE 1, and looking in the direction of the arrows.
Figure 4:
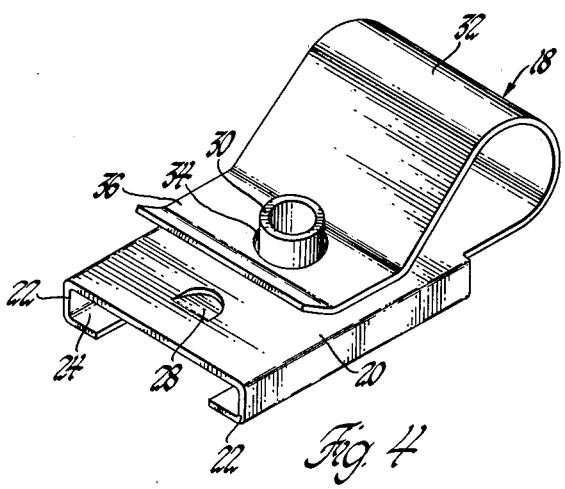
FIGURE 4 is a perspective view of the fastening device utilized in the combination of FIGURES 1–3.

Referring more particularly to the drawing, a typical example of a link connection is illustrated in FIGURES 1–3. A first link member, illustrated generally by the numeral 10, is to be secured to a second link member, illustrated generally by the numeral 12. It is proposed that link member 12 be pivotal and slidable with respect to link 10. Link 10 is provided with an aperture 14 adjacent the end thereof, and link 12 is provided with an elongated slot 16 adjacent its end. A fastening device, illustrated generally by the numeral 18, is received over the end of link 10, and receives and engages link 12 in a manner to be hereinafter described.

Fastener device 18 includes a generally planar body portion 20, provided with flanged edges 22 defining a channel 24 to receive the end of link member 10. Flanged edges 22 may be so formed as to be of substantially the same thickness as link 10 and thus clamp about link 10, or some external attaching means may be provided.

Formed out of the plane of body portion 20 is a first stop tab 26 which extends into the channel 24 formed by flanged edges 22. Stop tab 26 is designed to engage the end of link 10 and prevent movement of the fastening device 18 along the link 10 on installation. Although a single stop tab 26 is illustrated, it is contemplated that a plurality may be required in order to properly seat the device on the link, depending on the size and end configuration of the various parts.

A second stop tab 28 is also formed out of the body portion 20 and in the same direction as the stop tab 26 and flanged edges 22. Stop tab 28 has a degree of resilience to permit deflection into the plane of the body portion 20 upon installation of the fastening device 18 over the link 10. When the stop tab 28 comes into registry with aperture 14 of the link 10, tab 28 will spring downwardly into the aperture 14, thus preventing unauthorized removal of the fastening device 18 from the link 10. The fastening device may be removed by deflecting stop tab 28 back into the plane of body portion 20 until aperture 14 is disengaged.

A gudgeon or pivot means 30 is formed out of the plane of body portion 20 of the fastener device 18 and is located between stop tabs 26 and 28. Gudgeon 30 may take any suitable form. As illustrated in the drawing, gudgeon 30 is cylindrical and may be lanced or otherwise formed from the body portion 20. It is contemplated that a pivot means of other configuration may be provided, such as a dimple or depression in the body portion 20 or a separate stud member suitably secured in the body portion 20.

Extending from body portion 20 and generally axially of the fastener device 18 is a spring portion 32. Spring portion 32 is bent back upon itself, as illustrated in FIGURE 1, and may be provided with an aperture or the like 34 receivable over gudgeon 30. It is noted from FIGURES 1–3 that link 12 is received over gudgeon 30 by means of the elongated slot 16. Leg 36 of spring portion 32 may be flattened, as illustrated, for engagement with the link 12. The flattened part properly engages link 12 and forces the link into secure engagement with body portion 20 of the fastener device 18 and thus with link 10. It may also be noted that leg 36 may be lifted for removal of link 12 from the gudgeon 30.

It is seen that the configuration of elongated slot 16 defines the motion of link 12 relative to link 10. It is sufficient for aperture 16 to be merely circular in order to permit relative pivotal motion. With aperture 16 elongated, as illustrated in FIGURE 2, the link 12 is also permitted slidable movement with respect to link 10 as well as the aforesaid pivotal movement.

Thus, a fastener device is provided which positively and resiliently secures one lever or link member relative to another. The device is easily installed over the end of one of the link members and the second link member is easily received over the pivot portion of the fastener device. This makes an extremely simple assembly and an uncomplicated and inexpensive link-to-link connection.

What is claimed is:

1. A fastener device receivable on the end of a first link member and adapted to receive a second link member and permit pivotal movement of said second link member relative to said first link member, and comprising:
  a body portion having means formed thereon for receiving the end of said first link member and a planar surface for engaging said second link member;
  stop means formed out of said body portion and adapted to engage the end of said first link member and locate said fastener device relative to said first link member;
  pivot means formed out of said body portion and in a direction away from said means for receiving the end of said first link member, said pivot means being adapted to receive said second link member and permit rotation thereabout;

and a resilient portion extending from said body portion and adapted to engage said second link member and bias said second link member into engagement with said body portion and on said pivot means.

2. A fastener device receivable on the end of a first link member and adapted to receive a second link member and permit pivotal movement of said second member relative to said first member, and comprising:
a body portion having flanged edges forming a channel for receiving the end of said first link member and a planar surface for engaging said second link member;
a stop tab formed out of said body portion and adapted to engage said first link member and locate said fastener device relative to said first link member;
a gudgeon formed out of said body portion and in a direction away from said flanged edges, said gudgeon being adapted to receive said second link member and permit rotation thereabout;
and a spring portion extending from said body portion and adapted to engage said second link member and bias said second link member into engagement with said body portion and on said gudgeon.

3. A fastener device receivable on the end of a first link member and adapted to receive and retain a second link member in pivotal and slidable relation to said first link member, and comprising:
a body portion having flanged edges forming a channel for receiving the end of said first link member and a planar surface for engagement with said second link member;
stop means formed from said body portion and extending into said channel to locate said device relative to said first link member;
pivot means formed out of said body portion and extending from said planar surface and adapted to receive said second link member in pivotal and slidable relation to said first link member;
and a spring portion extending from said body portion and being return bent and adapted to engage said second link member and bias said second link member into engagement with said body portion and about said pivot means.

4. A fastener device receivable on the end of a first link member having an aperture therein and adapted to receive a second link member and permit pivotal movement of said second link member relative to said first link member, and comprising:
a body portion having flanged edges forming a channel for receiving the end of said first link member and a planar surface for engaging said second link member;
a first tab formed out of said body portion and adapted to engage the end of said first link member and locate said device with respect thereto;
a second tab formed out of said body portion and spaced from said first tab, said second tab being receivable in said aperture in said first link member and engageable with the edge of said aperture to prevent removal of said device from said first link member, said second tab being resilient to permit deflection thereof when said device is inserted on said first link member and return to the free position thereof when said second tab is in registry with said aperture;
pivot means formed out of said body portion and in a direction away from said flanged edges and disposed between said first and second tabs, said pivot means being adapted to receive said second link member and permit rotation thereabout;
and a resilient portion extending from said body portion and adapted to engage said second link member and bias said second link member into engagement with said body portion and about said pivot means.

5. A fastener device receivable on a first link member and adapted to receive a second link member for pivotal movement thereon comprising:
a body portion having flange portions forming channels fastening said fastener device on said first link member;
a resilient portion extending from said body portion in overlying relation with said body portion;
pivot means formed out of one of said body and resilient portions, the other of said body and resilient portions having an aperture receiving said pivot means;
said second link member being received between said body and resilient portions and having an aperture therein engaging said pivot means.

References Cited in the file of this patent
UNITED STATES PATENTS

| 413,401 | Sanders | Oct. 22, 1889 |
| 1,451,043 | Le Compte | Apr. 10, 1923 |
| 2,235,976 | Best | Mar. 25, 1941 |
| 2,793,388 | Bartholomew | May 28, 1957 |

FOREIGN PATENTS

| 27,379 | Great Britain | Nov. 28, 1912 |